Feb. 28, 1933.   F. GOLDENBERG   1,899,682
GRIDIRON
Filed March 28, 1931
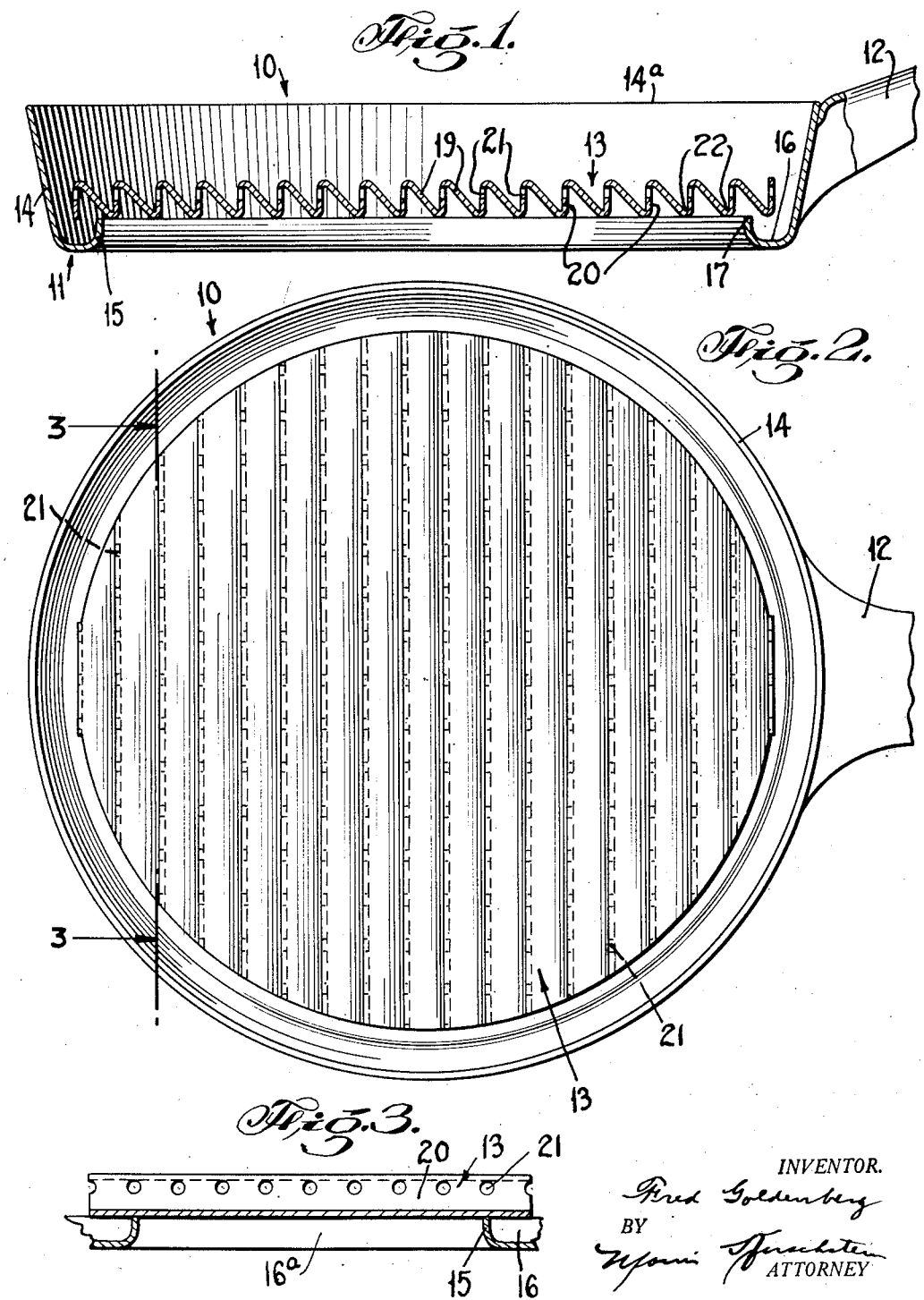
INVENTOR.
Fred Goldenberg
BY
ATTORNEY Patented Feb. 28, 1933

1,899,682

UNITED STATES PATENT OFFICE

FRED GOLDENBERG, OF BRONX, NEW YORK

GRIDIRON

Application filed March 28, 1931. Serial No. 525,952.

This invention relates to gridirons.

Among the objects of this invention is to provide a neat, compact and rugged gridiron for broiling steaks, chops or the like, which shall be relatively inexpensive to manufacture, comprise few and simple parts, easy to handle and clean and which shall yet be practical and efficient to a high degree in use.

Other objects of this invention will in part be obvious and in part hereinafter pointed out.

The invention accordingly consists in the features of construction, combination of elements, and arrangement of parts which will be exemplified in the construction hereinafter described, and of which the scope of application will be indicated in the following claims.

In the accompanying drawing, in which is shown one of the various possible illustrative embodiments of this invention.

Fig. 1 is an axial, cross-sectional view of a gridiron embodying my invention;

Fig. 2 is a top plan view of said gridiron; and

Fig. 3 is a cross-sectional view taken on line 3—3 of Fig. 2.

Referring now in detail to the drawing, 10 designates a gridiron or broiler embodying the invention. Said broiler 10 comprises generally a frame 11 having a handle 12 and a food supporting member 13, removably mounted on said frame. The frame 11 may be provided with an annular tapering wall 14 similar to the rim of a frying pan, and the handle 12 may be attached thereto in any suitable manner, said handle preferably projecting radially outwardly and inclined upwardly from said frame. At the lower edge thereof, the wall 14 is preferably provided with an inwardly and upwardly curved rim portion 15 forming a gutter or channel 16 and a central opening 16a, for the purpose hereinafter described. The upper rim edge 17 of said portion 15 is preferably disposed below the upper rim edge 14a of said wall 14. The member 13 may be made of a single piece of properly bent, shaped and stamped sheet metal. The member 13, is preferably circular in shape, and is adapted to rest on said upper rim edge 17 of the said portion 15.

Said member 13 is preferably corrugated and comprises a series of parallel inclined wall portions 19 interconnected by substantially vertical walls 20. Each of the vertical walls 20 may be provided with a series of spaced openings or apertures 21 preferably disposed adjacent the top thereof to provide V-shaped grooves or channels 22 for carrying juices from the broiled food to the gutter or annular channel 16.

It will now be understood that the gridiron 10 may be placed over the fire with the food to be broiled placed on top of the member 13. The heat and flames may thus pass through the openings 21 for broiling the food, and the juices flow down to the grooves 22, and to the ends of the groove to the channel 16 from where the juices may be removed by merely tilting the gridiron. The member 13, being removable, may be readily cleaned separately from the frame 11. By reason of the wall portions 20 being upright or vertical, the juices will not pass through the openings 21 to the flames, but will pass to the grooves 22. If desired, the walls 20 may also be inclined in the same direction as walls 19 but to a smaller degree, thus further aiding in preventing juices from running into the fire.

While the invention has been described with reference to its use for broiling, it will be understood that the device may also be employed in connection with baking and toasting, merely by placing a hood or cover thereon.

In making the member 13, a flat sheet of metal may be cut into oval shape, then punched to provide the openings 21 and then shaped in a stamping press to produce the parallel corrugations. The manufacture of the device 13 is thus simple and inexpensive and the gridiron nevertheless easy to handle and clean, and practical and efficient to a high degree in use.

It will thus be seen that there is provided a device in which the several objects of this invention are achieved, and which is well adapted to meet the conditions of practical use.

As various possible embodiments might be made of the above invention, and as various changes might be made in the embodiment set forth, it is to be understood that all matter herein set forth or shown in the accompanying drawing, is to be interpreted as illustrative and not in a limiting sense.

Having thus described my invention, I claim as new and desire to secure by Letters Patent:

1. A gridiron comprising a one-piece open-bottom ring member having an annular tapering outer wall reflexed inwardly and upwardly forming an annular channel having an inner rim edge disposed below the top edge of said tapering wall, a handle attached to said tapering wall, and a circular closed-bottom grid-member removably resting on said rim edge and disposed below the upper edge of said tapering wall, said circular grid-member comprising a single piece of sheet material having a series of spaced vertical interconnected walls forming channels open at both ends and overlying said annular channel, said walls having apertures therein, said grid-member removably retained in position on said rim edge within said ring member by said annular tapering wall.

2. A gridiron comprising a one-piece open-bottom member having an outer peripheral wall having its bottom reflexed inwardly and upwardly forming a continuous peripheral channel having an inner rim edge disposed below the top edge of said outer wall, a handle attached to said outer wall, and a closed-bottom grid-member removably resting on said rim edge and disposed below the upper edge of said outer wall, said grid-member comprising a single piece of sheet material having a series of parallel inclined wall portions interconnected by a series of alternating substantially upright wall portions forming channels open at both ends of said wall portions and overlying said first peripheral channel, said upright wall portions having apertures therein, said grid member removably retained in position on said rim edge within said open bottom member by said outer peripheral wall.

In testimony whereof I affix my signature.

FRED GOLDENBERG.